United States Patent
Puma et al.

(10) Patent No.: US 10,011,244 B1
(45) Date of Patent: Jul. 3, 2018

(54) SEAT BELT HOLDING APPARATUS

(71) Applicants: Mike Puma, Wesley Chapel, FL (US); Anthony Wolf, Toronto (CA)

(72) Inventors: Mike Puma, Wesley Chapel, FL (US); Anthony Wolf, Toronto (CA)

( * ) Notice: Subject to any disclaimer, the term of this patent is extended or adjusted under 35 U.S.C. 154(b) by 307 days.

(21) Appl. No.: 15/049,882

(22) Filed: Feb. 22, 2016

(51) Int. Cl.
*B60R 22/00* (2006.01)
*B60R 22/18* (2006.01)
*A44B 11/25* (2006.01)

(52) U.S. Cl.
CPC .......... *B60R 22/18* (2013.01); *A44B 11/2546* (2013.01); *B60R 2022/1806* (2013.01)

(58) Field of Classification Search
CPC ............ B60R 22/18; B60R 2022/1806; B60R 2022/021; B60R 22/02; B60R 22/22; A44B 11/2546; A44B 11/2576; Y10T 24/10; Y10T 24/3401; Y10T 24/40; Y10T 24/4736; Y10T 24/45084; Y10T 24/45263; Y10T 24/45241; Y10T 24/32483; Y10T 24/45628; Y10T 24/45623

USPC ................................ 297/481–482; 403/109.1
See application file for complete search history.

(56) References Cited

U.S. PATENT DOCUMENTS

| | | | | |
|---|---|---|---|---|
| 4,901,407 A | * | 2/1990 | Pandola | A44B 11/2576 24/442 |
| 5,098,162 A | * | 3/1992 | Forget | B60R 22/22 297/482 |

* cited by examiner

*Primary Examiner* — Jack W Lavinder
(74) *Attorney, Agent, or Firm* — Gulf Coast Intellectual Property Group

(57) ABSTRACT

A seat belt buckle holding apparatus configured to receive and retain a female portion of a seat belt buckle so as to provide improved access thereto when adjacent a child booster seat. The seat belt buckle holding apparatus includes a housing being rectangular in shape having an exterior wall. The housing includes an upper end and a lower end. A central passage is centrally formed in the housing and extends intermediate the upper end and the lower end. The central passage includes an interior wall wherein the interior wall has gripping members formed thereon. The gripping members extend substantially the length of the central passage and are tapered in shape having a greater width proximate the upper end of the housing.

8 Claims, 1 Drawing Sheet

SEAT BELT HOLDING APPARATUS

PRIORITY UNDER 35 U.S.C SECTION 119(E) & 37 C.F.R. SECTION 1.78

This nonprovisional application claims priority based upon the following prior U.S. Provisional Patent Application entitled: Seat buckle holder, Application No. 62/220,218 filed Sep. 17, 2015, in the name of Anthony Wolf, which is hereby incorporated by reference for all purposes.

FIELD OF THE INVENTION

The present invention relates generally to safety devices, more specifically but not by way of limitation a holding apparatus for the female receptacle portion of a conventional seat belt wherein the holding apparatus is configured to receive and maintain the female portion of a seat belt in an upright and readily accessible position.

BACKGROUND

Millions of parents and/or caretakers transport small children to various destinations everyday utilizing an automobile. It is recommended that children under certain ages and specifically those under eighty pounds utilize a car seat or a booster seat so as to properly position the child in order to ensure the seat belt of the automobile will provide proper restraint in the event of an accident. As is known in the art, a conventional automobile seat belt includes a male portion having a nylon strap that is commonly positioned with one end being secured such that it is at or slightly above shoulder level. A female portion is further included having a nylon strap with an end typically secured to the floorboard or frame of the automobile and wherein the female portion is extended up through a void in the seat so as to lay flat on the surface thereon.

One issue with utilization of conventional child car seats and/or booster seats is the cumbersome nature of securing the male portion of the vehicle's seat belt to the female portion. Many times the female portion of the seat belt will become lodged either under the car seat or booster seat requiring the removal or moving of the car/booster seat in order to locate and reposition the female portion of the seat belt. Another issue is the access to the female portion of the seat belt ensuing a child being seated in the car/booster seat. It can be difficult for parents or other individuals attempting to secure the male portion of the seat belt into the female portion when reaching over the child while bent down into the back seat. This can sometimes lead to an improper and/or incomplete connection between the male portion and female portion of the seatbelt.

Accordingly, there is a need for a seat belt holding apparatus that is configured to receive and retain the female portion of a seat belt in an accessible and upright position so as to improve a user's ability to connect the seat belt when being utilized to restrain a child in a booster and/or car seat

SUMMARY OF THE INVENTION

It is the object of the present invention to provide a seat belt holding apparatus that is operable to receive and retain the female portion of a conventional vehicle seat belt so as to improve access thereto.

Another object of the present invention is to provide a seat belt holding apparatus that is operable to engage with the female portion of a conventional seat belt wherein the seat belt holding apparatus includes a housing having an upper end and a lower end.

A further object of the present invention is to provide a seat belt holding apparatus that is operable to receive and retain a female portion of a conventional seat belt so as to improve access thereto wherein the housing further includes an opening at the upper end and lower end thereof.

Still another object of the present invention is to provide a seat belt holding apparatus that is operable to engage with the female portion of a conventional seat belt wherein the housing further includes a hollow passage intermediate the openings at the upper end and lower end thereof.

An additional object of the present invention is to provide a seat belt holding apparatus that is operable to receive and retain a female portion of a conventional seat belt so as to improve access thereto wherein the housing is generally rectangular in shape and further includes a tapered exterior wall.

Yet a further object of the present invention is to provide a seat belt holding apparatus that is operable to engage with the female portion of a conventional seat belt wherein the hollow passage includes an interior wall with the interior wall having gripping members formed thereon.

Another object of the present invention is to provide a seat belt holding apparatus that is operable to receive and retain a female portion of a conventional seat belt so as to improve access thereto wherein the gripping members are vertically positioned intermediate the openings at the upper end and lower end and wherein the gripping members are tapered in shape having a width proximate the lower end that is less than that of the width proximate the upper end.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
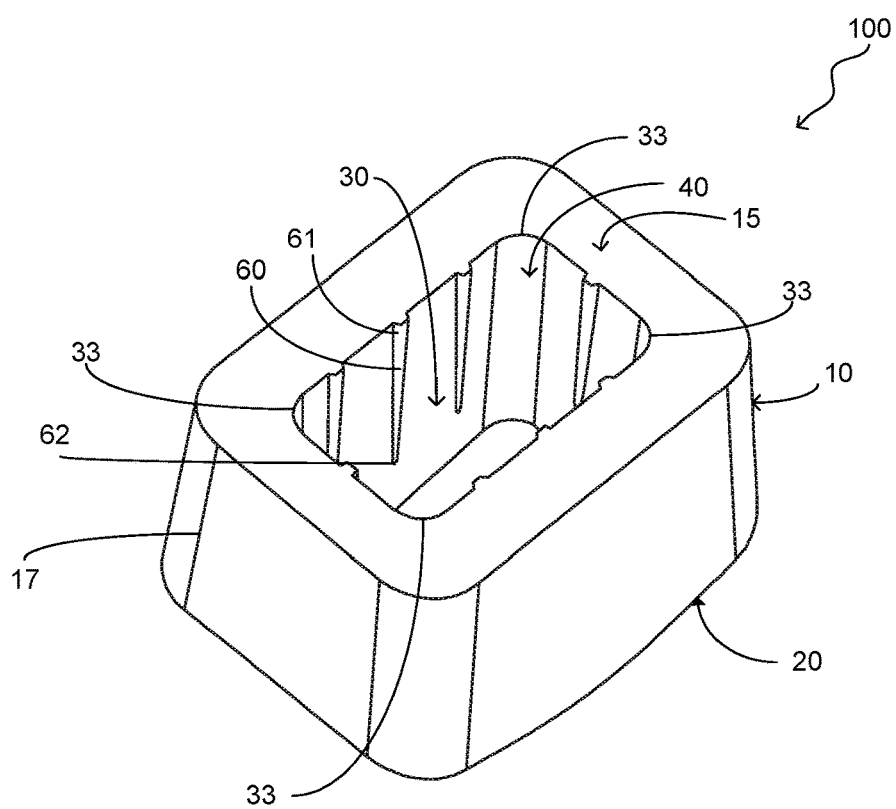
FIG. 1 is a perspective view of the present invention.
Figure 2:
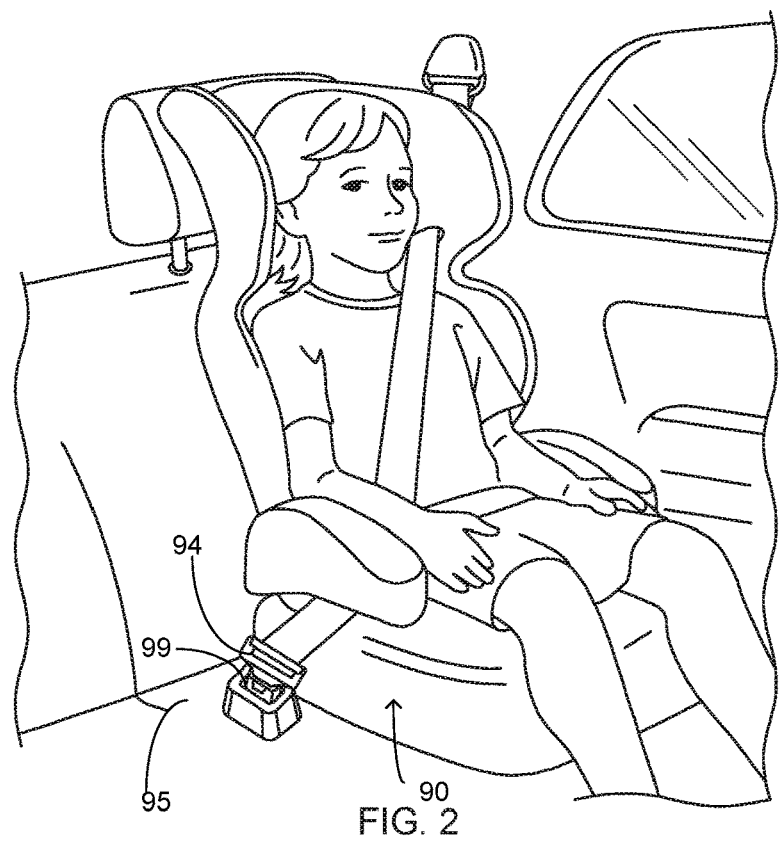
FIG. 2 is a perspective view of the present invention in an environment of intended use.

Referring now to the drawings submitted herewith, wherein various elements depicted therein are not necessarily drawn to scale and wherein through the views and figures like elements are referenced with identical reference numerals, there is illustrated a seat buckle holding apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to FIG. 1, the seat buckle holding apparatus 100 is illustrated therein. The seat buckle holding apparatus 100 is operable to receive and retain a female portion 99 of a conventional seat belt deployed in an automobile. The seat buckle holding apparatus 100 further includes a housing 10 being manufactured from a suitable durable material such as but not limited to plastic. The housing 10 is generally rectangular in shape having an upper end 15 and a lower end 20. While the housing 10 is illustrated herein as being rectangular in shape, it is contemplated within the scope of the present invention that the housing 10 could be formed in numerous different shapes. The housing 10 further includes exterior wall 17 that is tapered in manner wherein the exterior wall 17 tapers outward traveling from the upper end 17 to the lower end 20. The tapered exterior wall 17 of the housing 10 helps form a shape of the housing 10 that is more stable as the lower end 20 of the housing is wider than that of the upper end 15 and provides improved stability ensuing being superposed a conventional automobile seat 95.

The housing 10 includes a central passage 30 bored therethrough that extends through the housing 10 intermediate the upper end 15 and lower end 20. The central passage 30 is hollow and is generally rectangular in shape. The central passage 30 is defined by interior wall 40. Interior wall 40 extends the entire length of the central passage 30. The central passage 30 is formed such that the corners 33 thereof are rounded in shape. The rounded shape of the corners 33 assist in the initial journaling of the female portion 99 of the conventional seat belt. During deployment of the seat buckle holding apparatus 100 the female portion 99 of a conventional seat belt is journaled through the central passage 30 beginning at the lower end 20 continuing towards the upper end 15 such that at least a portion thereof is extending outward from the upper end 15. Once the aforementioned position has been obtained the seat buckle holding apparatus 100 is superposed the car seat 95 such that the seat buckle holding apparatus 100 is adjacent the exemplary booster seat 90. The seat buckle holding apparatus 100 provides improved access to the female portion 95 so as to facilitate improved access thereto in order to connect the male portion 94 to the female portion 99.

Integrally formed with the interior wall 40 are gripping member 60. Gripping members 60 are formed with the interior wall 40 utilizing suitable durable techniques and are formed substantially around the central passage 30. The gripping members 60 extend outward from the interior wall 40 and are operable to provide positional assistance of the female portion 99 subsequent being inserted through the central passage 30. The gripping members 60 are tapered in shape having a first end 61 proximate the upper end 15 and a second end 62 proximate the lower end 20. The second end 62 has a width that is less than that of the first end 61 producing the aforementioned tapered shape of the gripping members 60. The aforementioned tapered shape promotes improved ability to journal the female portion 99 from the lower end 20 towards the upper end 15. The greater width of the gripping member 60 proximate the first end 61 promotes the retaining of the female portion 99 is a desired position so as to promote improved access thereto. The greater width of the gripping member 60 at first end 61 provides a ridge for the female portion 99 to bias thereagainst and be releasably retained in an accessible position. It is contemplated within the scope of the present invention that the gripping member 60 could be formed in alternate shapes and achieve the desired objective herein. Furthermore, it is contemplated within the scope of the present invention that various quantities of the gripping member 60 could be formed on the interior wall 40.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A seat buckle holding apparatus configured to receive and retain a female portion of a seat belt so as to provide improved access thereto comprising:

a housing, said housing having an upper end and a lower end, said housing having a central passage extending therethrough intermediate said lower end and said upper end, said central passage including an interior wall, said interior wall of said central passage having four corners, said four corners being rounded in shape, said housing being rectangular in shape, wherein the housing further includes an exterior wall, said exterior wall being tapered in shape, said exterior wall tapering outward from said upper end of housing to said lower end of said housing;

a plurality of gripping members, said gripping members being formed in said interior wall of said central passage, said gripping members configured to retain a female portion of a seat belt buckle subsequent being journaled through said central passage; and wherein said central passage is configured to receive a female portion of a seat belt buckle therethrough and maintain in an accessible position proximate the upper end of the housing.

2. The seat buckle holding apparatus as recited in claim 1, wherein said plurality of gripping members include a first end and a second end, said first end of said gripping members being proximate said upper end, said second end of said gripping members being proximate said lower end of said housing, said first end of said gripping members being greater in width than said second end of said gripping members.

3. The seat buckle holding apparatus as recited in claim 2, wherein said housing is manufactured from plastic.

4. A seat belt buckle holding apparatus that is configured to receive and retain a female portion of a seat belt buckle so as to improve access thereto when adjacent a child booster seat comprising:

a housing, said housing having an upper end and a lower end, said housing being rectangular in shape, said housing having an exterior wall;

a central passage, said central passage extending through said housing intermediate said lower end and said upper end, said central passage having an opening proximate said lower end and proximate said upper end, said central passage having an interior wall; and a plurality of gripping members, said gripping members being formed in said interior wall of said central passage, said gripping members configured to retain a female portion of a seat belt buckle subsequent being journaled through said central passage; and wherein said plurality of gripping members include a first end and a second end, said first end of said gripping members being proximate said upper end, said second end of said gripping members being proximate said lower end of said housing, said first end of said gripping members being greater in width than said second end of said gripping members.

5. The seat belt buckle holding apparatus as recited in claim 4, wherein the interior wall of said central passage includes four corners, said four corners being rounded in shape.

6. The seat belt buckle holding apparatus as recited in claim 5, wherein the housing further includes an exterior wall, said exterior wall being tapered in shape, said exterior wall tapering outward from said upper end of housing to said lower end of said housing.

7. The seat belt buckle holding apparatus as recited in claim 6, wherein said housing is manufactured from plastic.

8. The seat belt buckle holding apparatus as recited in claim 7, wherein the housing is operable to be superposed a car seat adjacent to a child booster seat and provide positioning of a female portion of a seat belt buckle so as to improve access and connection with a male portion of a seat belt buckle.

* * * * *